United States Patent [19]
Coe

[11] Patent Number: 5,313,677
[45] Date of Patent: May 24, 1994

[54] DUAL OUTLET BATHTUB DRAIN VALVE AND WATER CONSERVATION SYSTEM

[76] Inventor: John A. Coe, 615 Marguette St., Pacific Palisades, Calif. 90272

[21] Appl. No.: 28,242

[22] Filed: Mar. 9, 1993

Related U.S. Application Data

[63] Continuation-in-part of Ser. No. 775,706, Oct. 10, 1991, Pat. No. 5,210,886.

[51] Int. Cl.⁵ .................. E03C 1/232; F16K 31/44; F17D 1/13
[52] U.S. Cl. .................................. 4/683; 137/597; 137/625.15; 251/279
[58] Field of Search .............. 4/317, 318, 546, 559, 4/597, 605, 625, 626, 638, 653, 664, 665, 682, 683; 137/597, 625.15, 625.16, 625.46, 876; 251/279, 293

[56] References Cited

U.S. PATENT DOCUMENTS

| | | | |
|---|---|---|---|
| 583,906 | 6/1897 | Hull | 137/597 |
| 1,155,871 | 10/1915 | Bauer | 251/293 X |
| 2,045,308 | 6/1936 | Wolff | 137/597 X |
| 2,651,051 | 9/1953 | Parks et al. | 251/235 X |
| 3,108,779 | 10/1963 | Anderson | 251/315 X |
| 3,535,712 | 10/1970 | Zeff et al. | 4/317 |
| 3,717,142 | 2/1973 | Mickelson | 4/559 X |
| 5,210,886 | 5/1993 | Coe, III | 4/665 |

Primary Examiner—Robert M. Fetsuga
Attorney, Agent, or Firm—Walter A. Hackler

[57] ABSTRACT

A system for recycling water used in a bathtub/shower is disclosed. The system alternatively directs water drained from the shower or bathtub to either a recycled water storage tank or a sewer line. The water in the recyclable water tank is subsequently pumped to a sprinkler system or an outdoor faucet. The water is directed to either the sewer line or the storage tank through the use of a valve with a first inlet for accepting water from the drain of the bathtub, a second inlet for accepting water from the overflow drain of the bathtub, a first outlet leading to the sewer line, and a second outlet leading to the recycled water storage tank. The valve is operative for blocking either the first inlet, the first outlet or the said second outlet only, and all other parts remain open. The position of a rotatable element of the valve is controlled by a lever mounted on the bathtub overflow plate. The lever is interconnected to the rotatable element, such that changing the position of the overflow plate lever causes the rotatable element of the valve to change positions.

5 Claims, 5 Drawing Sheets

DUAL OUTLET BATHTUB DRAIN VALVE AND WATER CONSERVATION SYSTEM

This application is a continuation-in-part of U.S. patent application Ser. No. 07/775,706 filed Oct. 10, 1991, now U.S. Pat. No. 5,210,886.

The present invention generally relates to a water conservation system utilizing a valve for bathtub, shower, or bathtub/shower combination drains, and more particularly to a water conservation system utilizing a valve providing two outlets for a bathtub/shower drain, one outlet for sewage water, and a second outlet for recyclable water.

Chronic, and often severe, water shortages exist in many parts of the United States and elsewhere in the world. Such water shortages, for example in the Southwestern United States, are growing more acute from year to year as a result of natural population increase and the southwestern shift of population from Eastern and Northern States. The State of California has, as an illustration, recently suffered several years of unusually low rainfall and drought conditions are threatening agriculture, industry, businesses and homeowners. In response thereto, cities such as Santa Barbara and Los Angeles have mandated water conservation practices and slow-or-no growth policies have been instituted in many places because of the unavailability of water for new residence.

Although these water shortage problems may be ameliorated—in the short term—by several years of good rainfall, the long term prognosis is unfavorable considering the increases in population and the ever-increasing need for water. As a result, good water conservation practices are needed if water-scarce regions of the world are to prosper or even survive.

Some heavy water-using industries have developed elaborate and expensive treatment facilities for reclaiming used water and reusing the water for industrial purposes. However, such facilities are extremely costly and have, therefore, generally been limited to large industries which can afford the cost, and especially those industries in which the cost of using reclaimed water is less than the cost of water supplied by local water districts or municipalities.

Few serious attempts have, however, been made by homeowners to reclaim gray-water and use it for lawns and the like. What attempts that have been made have usually involved using buckets to collect wash water and emptying the buckets on shrubs and flowers to keep them alive. There have been, to date, no practical system for recycling the relatively large amounts of water used for showering, bathing and for washing clothes. This water includes water wasted by running hot water until the shower or bath water reaches a temperature at the tap suitable to the user. During the minutes typically required for cold water to be pumped from the hot water line, gallons of clean water flow into the sewer lines. A typical non-low flow shower head emits approximately four to six gallons of water a minute. Consequently, eight to twelve gallons of water are wasted during a two minute warm-up time.

In any event, the physical problems of handling buckets of wash water can be expected to limit any serious use of such methods and the amount of fresh water saved by such methods is considered to be minimal considering the amount of fresh water that is used.

As another method of conserving water, water companies are also suggesting the elimination or reduction of landscape irrigation and lawn watering. Therefore, many homeowners have allowed their landscaping to suffer in an attempt to avoid using large amounts of water for irrigation.

The problem created by the waste of relatively clean bath and shower water is two-fold. The first problem is the usage and cost of the water. The second problem is the increased sewer handling requirements created by the water in the sewer lines. In many municipalities, sewage treatment requirements have become a substantial problem. As populations have increased, standards for the treatment of sewage has become more stringent, and the expensive piping system that conveys the sewage to the treatment plants is often on the brink of capacity, and in need of replacement due to age. The large amounts of relatively clean water that dilute the sewage create a need for larger sewer pipelines, and make it more difficult to treat the sewage. If the relatively clean water was removed from the sewage system, smaller sewer lines would suffice, and the sewage would be easier to handle.

What is needed is a system for automatically collecting gray-water and making it available without any physical handling of the water by individuals needed and such that the amount of fresh water saved by the water reuse system is substantial and continual and the costs associated with the water reuse system—including installation cost and maintenance—is at least offset by reduced water bills.

It is the principal purpose of the present invention to provide such a system for reusing gray-water in a safe, economical and trouble-free manner, and for providing a system which works in a continual manner with minimal attention required. Such a system of the present invention is particularly suited for the watering of landscape for homes, apartments, hotels, motels, and the like.

SUMMARY OF THE INVENTION

In accordance with the present invention, a system for recycling water from a bathtub/shower generally includes a water storage tank and a recycle water line extending between a bathtub/shower and the water storage tank.

Valve means are provided for selectively directing water from the bathtub/shower into the recycle line and into a sewer line.

To enable manual selection, handle means is provided and connected to the valve means.

Tank valve means, disposed in the water storage tank, is provided for dispensing a waste water treatment fluid in response to water flowing into the tank from the recycle water line. Importantly, the dispensing of the waste water treatment fluid is in proportion to the water flowing into the tank so that heavier flows of water will receive proportionately larger amounts of waste water treatment fluid. Naturally, when no water is flowing into the storage tank, the waste water treatment fluid is not dispensed.

In addition, float means, disposed in an operative relationship with the tank valve means, is provided for shutting the tank valve means when a water level in the tank reaches a selected level in order to prevent tank overflow. Use of the stored water is through pump means for removing water from the tank which may be subsequently used for watering lawns and the like as "gray" water.

Importantly, the valve means in accordance with the present invention is sized and has inlet and outlet fittings thereon to enable the valve means to directly replace a conventional bathtub/shower drain valve. This provides considerable economic advantage of the present invention and enables it to be retrofitted into existing homes without substantial replumbing or replacement of existing drain lines or the bathtub/shower itself.

More particularly, the valve means may include a first inlet connected to a bathroom/shower drain line for accepting water from the drain line and a second inlet connected to a bathroom/shower overflow line for accepting water from the overflow line.

A first outlet of the valve means is connected to a sewer line and a second outlet is connected to the recycle water line.

In addition to the fittings being sized for direct replacement of a conventional bathroom/shower drain valve, each of the first inlet, first outlet and second outlet have full port inlets and outlets, respectively, which are of the same internal diameter as the line to which they are to be connected. This ensures proper flow of water to the extent available before the valve means of the present invention is utilized. This is particularly important with the overflow line.

Rotatable means are provided for alternatively blocking the first outlet and the second outlet such that water from the first inlet and the second inlet flows out of the second outlet when the first outlet is blocked, and water from the first inlet and the second inlet flows out of the first outlet when the second inlet is blocked. The rotatable means includes a three-directional passage which is fully open to three of the inlets and outlets when either of the first outlet or the second outlet is blocked.

A rotatable means includes an element having said three-directional passage therethrough and disposed within an intersection of the first inlet, second inlet, first outlet and the second outlet.

A handle is provided and connected to the element for rotating the element within the valve.

A lever, disposed in the bathroom/shower and accessible to the user thereof, for selectively directing water into the sewer line, the recycle line or shutting the drain line from the bathtub/shower to enable the filling thereof.

Tank means are also provided and disposed within the storage tank for cooling a supply of waste treatment fluid. In addition, a first means is provided for electrically disconnecting the pump means when an amount of waste water treatment fluid in the tank reaches a selected minimum amount. This ensures that water which has not been properly treated will not be removed from the tank for gray water use. The selected minimum amount of water treatment fluid may be selected so that additional water added to the storage tank, after the electrical power has been disconnected, is still be properly treated.

A second means is provided for electrically disconnecting the pump when a low water level in the storage tank is reached.

A single mercury switch is provided along with mechanical linkage with the first and second means for interrupting the electrical power to a motor driving the pump means.

More particularly, the first means comprises a mount pivotably supporting the tank means and linkage means for coupling the tank means to the mercury switch in a manner enabling the weight of the tank means and the waste treatment fluid therein to actuate the mercury switch. The second means comprises a low level float having an arm means, attached thereto, for coupling a low level float to the mercury switch means in a manner enabling a level of the low level float to actuate the mercury switch.

In addition, the system in accordance with the present invention, further includes yoke means for supporting the linkage means and the arm means and a pivot bar attached to the mercury switch for enabling either the linkage means or the arm means to actuate the mercury switch.

In order to provide an indication of water level within the tank, a fluid level gauge means, connected to the low level float, may be provided for indicating the water level in the storage tank.

BRIEF DESCRIPTION OF THE DRAWINGS

The advantages and features of the present invention will be better understood by the following description when considered in conjunction with the accompanying drawings in which.

DETAILED DESCRIPTION

Figure 1:
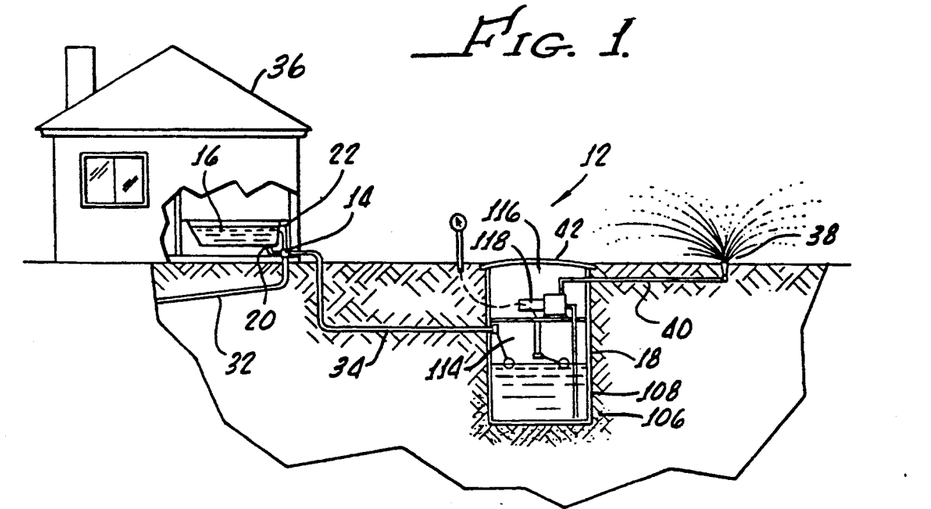
FIG. 1 is a representational drawing of the system in accordance with the present invention for recycling water using the bathtub/shower drain valve of the present invention.
Figure 3:
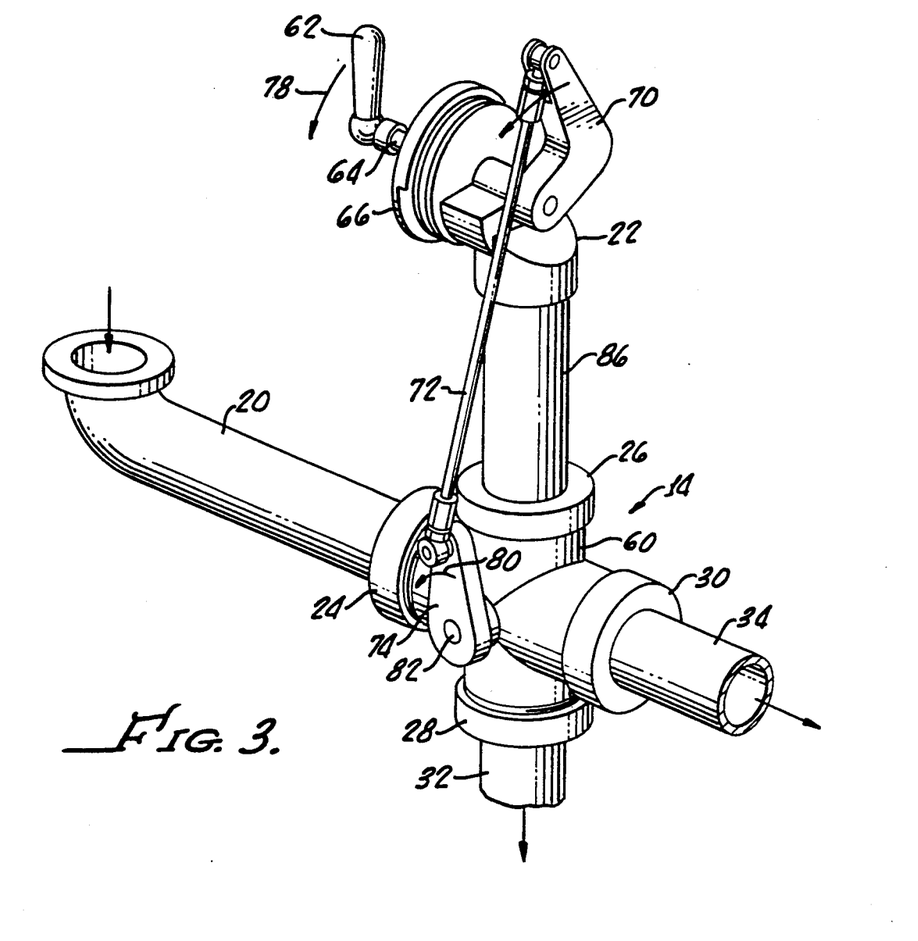
FIG. 3 is a perspective view of the bathroom/shower valve in accordance with the present invention.

Referring first to FIGS. 1 and 3, the preferred use of a water-conservation system 12 utilizes a dual outlet bathtub/shower drain valve 14 of the present invention is shown. The primary components of the water-conservation systems 12 include a standard bathtub/shower combination 16, the dual outlet valve 14, and a storage tank 18. A standard bathtub/shower combination 16 includes a drain outlet 20 and an overflow outlet 22. The valve 14 includes a first inlet port 24, a second inlet port 26, a first outlet port 28 and a second outlet port 30. The bathtub drain outlet 20 connects to a first inlet port 24 of the valve 14, and the bathtub overflow outlet 22 connects to the second inlet port 26 of the valve 14. The first outlet port 28 of the valve 14 is connected to a sewer line 32 and the second outlet port 30 is connected to a recycle water line 34 leading to the storage tank 18.

As depicted in FIG. 1, the storage tank 18 is preferably located a few feet below the level of the standard bathtub 16, such that gravity causes the recycled water to naturally flow from the second outlet 30 to the storage tank 18 through the recycle line 34. Naturally, a pump may be provided if the storage tank 18 is mounted above ground (not shown) or a sump arrangement (not shown) may be utilized. The use of a pump allows the water storage tank to be located above ground.

In the embodiment shown, the water storage tank 18 is located a few feet below ground level in the yard just outside of the foundation of the house 36. However, in some home locations, the water storage tank 18 may be located wherever most convenient. For example, in a home with the garage below the house, the water storage tank 18 may be located in the garage. The advantages of locating the water storage tank either underground or in a garage are that the tank is protected from freezing temperatures and that a hidden tank is more aesthetically pleasing than a tank in full view.

The water in the storage tank 18 may be directed from the tank 18 to a sprinkler system 38 by means of an irrigation line 40. Naturally, the water in the storage tank 18 may also be used in an agricultural irrigation system or used for hosing driveways, handwatering and other purposes.

If the user desires the connection of a city water supply, to the same irrigation line 40, an antisyphon valve in the shutoff valve may be required in order to satisfy municipal plumbing codes. Depending upon the size of the yard and the number of residents in the house, in many cases it is likely that the recycled water supply will be sufficient, meeting all landscape watering requirements, thereby eliminating the need for city water supply connections.

In addition, for safety purposes, any outlet for the water from the storage tank should include a label reading: "Non-potable water", or "Do not drink." A similar notice should also be placed on the tank top 42.

Figures 4A, 4B, 4C:
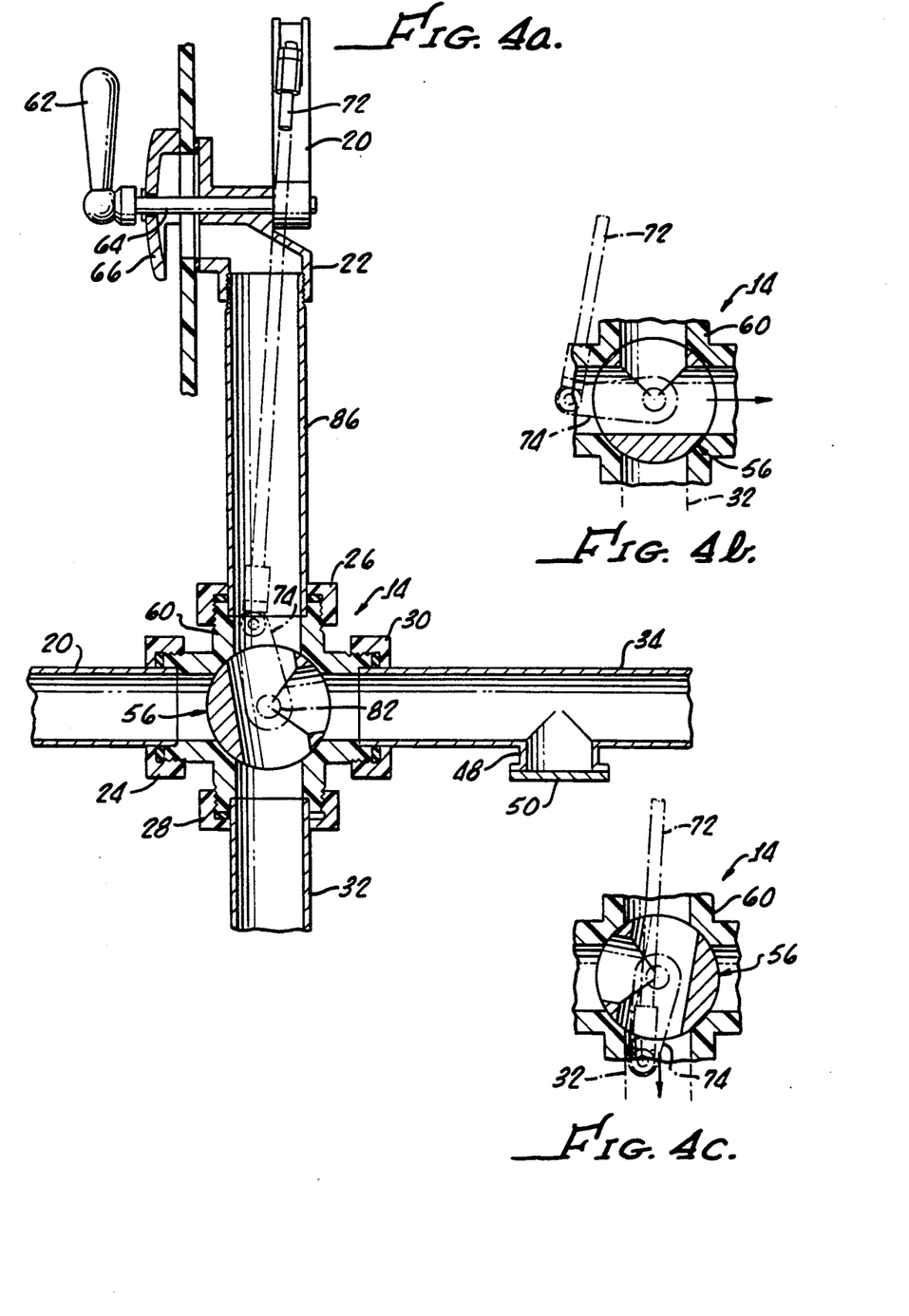
FIG. 4a is a cross-sectional view of the valve shown in FIG. 3 in which the bathtub/shower drain line is closed and the overflow remains open to the tank or the sewer line.
FIG. 4b is a partial cross-sectional view showing the valve rotated 90° so that water from the bathtub/shower drain line passes into the water recycle line.
FIG. 4c is similar to FIG. 4b, with the valve rotated 180° so that water from the drain line passes into the sewer line.

Turning now to FIGS. 3 and 4, the preferred embodiment of the dual outlet valve 14 of the present invention is shown in detail. As briefly described, the valve 14 includes two inlet ports 24, 26 and two outlet ports 28, 30. The drain outlet 20 from the bathtub 16 is coupled to the first inlet port 24 of the valve 14, and the overflow outlet 22 from the bathtub 16 is coupled to the second inlet port 24 of the valve 14. The first outlet port 28 of the valve 14 is connected to the sewer line 32 and the second outlet port 30 of the valve 14 is coupled to the recycle line 40.

It is important to note that the first and second inlets 28, 30 and the outlet 28 are sized and positioned such that the valve 14 may be installed as a direct substitute for a prior art valve 46 shown in FIG. 2 and hereinafter described in greater detail. This configuration enables the valve of the present invention to be used for retrofitting existing bathtub/showers 16 without rearrangement of existing plumbing lines.

Preferably, a simple dripleg 48, with a removable cap 50, is installed in the recycle line 34 in order to trap dirt or any other heavy contaminants. If the valve 14 is installed in a shower stall without an overflow drain, the second inlet 26 is preferably connected to an air vent (not shown) to allow the flow the water through the valve 14.

The valve 14 includes a 1 and ½ inch outlet 28, 30, 32, 34, a rotatable element 56, shown in cross-section in FIGS. 4a, 4b and 4c, provides a rotatable means for alternatively blocking the first outlet 28 and the second outlet 30, such that water from the first inlet 24 and the second inlet 26 flows out the second outlet 30 when the first outlet is blocked and the water from the first inlet 24 and the second inlet 26 flows out the first outlet 28 when the second outlet 30 is blocked, the element 56 may be either a ball or cylinder, includes a three-dimensional passage which is fully open to three of the inlets and outlets when either the first outlet 28 or the second outlet 30 is blocked. FIG. 4a shows the element 56 oriented to block the bathtub/shower drain 20 when a user fills the bathtub/shower 16. As shown in FIG. 4b, the element 56 is oriented to block the sewer line 32 so that water may flow from the first and second inlets 24, 26 to the second outlet 30 and in FIG. 4c, the element 56 is oriented to block the second outlet 30 so that water from the first and second inlets 24, 26 may flow to the first outlet 28 and into the sewer line 32.

The valve 14 includes 1 and ½ inch full port inlets in 24, 26 and outlets 28, 30 and the element 56 has a three-directional passageway for water flow. The valve 14 would also conform with IAPMO Standards and as shown in FIGS. 4a–4c, the valve passageway fully opens the water communication between the inlets 24, 26 and outlets 28, 30 without restricting the gravity flow of water therethrough.

As most clearly shown in FIG. 3, the rotatable element 56 of the valve 14 is interconnected through a casing 60 to a handle 62. In the preferred embodiment, the handle 62 has three positions, each corresponding to the positions of the rotatable element 56 shown in FIGS. 4a–4c. The handle 62 is connected via a shaft 64 through an overflow fitting 66 to a lever arm 70 which in turn is connected via a rod 72 to a valve lever arm 74. Rotation of the handle 62 in the direction of arrow 78 rotates the valve lever arm 74 in the direction of arrow 80 which in turn rotates the element 56 via a shaft 82. This arrangement enables a 180° rotation of the element 56 within the casing 60 in order to direct the flow of water from the drain 20 into either the sewer line 32 or the recycle line 34 or alternatively blocking the drain line 20 so the bathtub/shower 16 may be filled.

As shown in FIG. 3, the rod 72 maintains a close proximity with the overflow line 86 which enables the valve 14 to be installed in pre-existing bathtub/shower 16 where the existing plumbing and construction may inhibit the available area for the valve.

Figure 2:
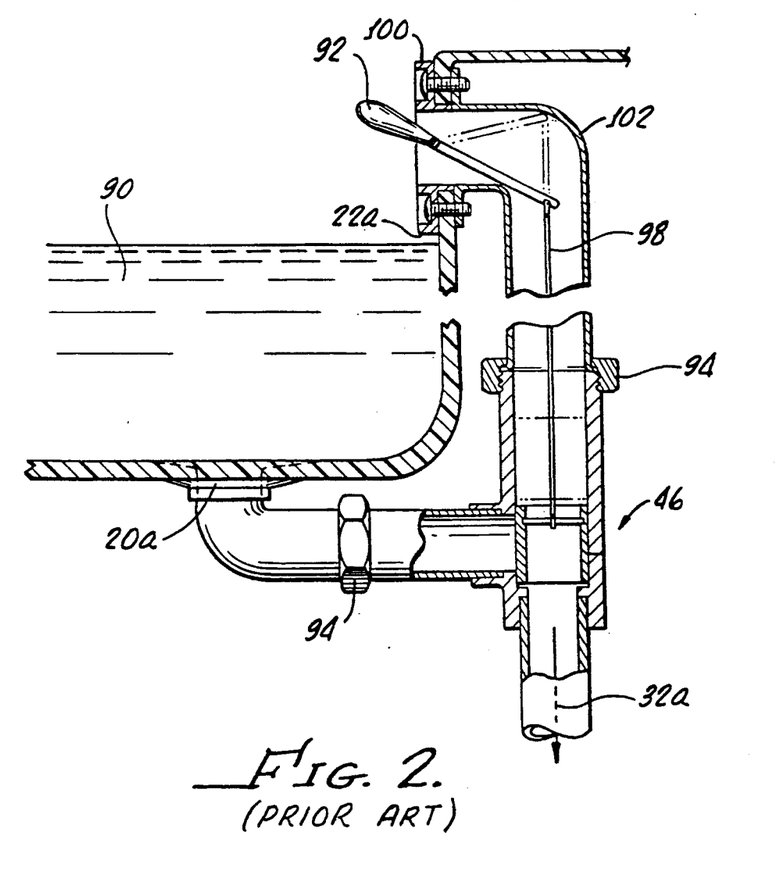
FIG. 2 is a partial cross-sectional view of a bathtub/shower drain valve in accordance with the prior art.

For the purposes of reference, a standard plumbing arrangement in a pre-existing bathtub/shower 90 is shown in FIG. 2. As illustrated in FIG. 2, a stop drain lever 92 exists in the prior art plumbing as does a bathtub/drain outlet 20a and an overflow outlet 22a. The prior art valve 46 is connected to the drain outlet 20a and the overflow outlet 22a and sewer line 32a by a plurality of unions 94. In the prior art plumbing, the lever 92 is shifted from a first position to a second position in order to operate a control rod for blocking the bathtub/shower drain outlet 20a so that the bathtub/shower 16 may be filled with water.

A dual outlet valve 14 of the present invention is easily installed in the pre-existing prior art plumbing as shown in FIG. 2 by a kit in accordance with the present invention. The kit includes the valve 14, handle 62, lever 70, rod 72, an overflow outlet, or elbow, 22, along with the overflow fitting 66.

To install the valve 14, a pre-existing overflow fitting 100, lever 92, elbow 102, and rod 98 are removed. The old valve 46 is also removed from the plumbing by loosening the three unions 94. The new valve 14 is then inserted and the recycle line 34 installed. The new handle 62, overflow fitting 66, rod 72 then installed. It should be noted that preferably the new overflow fitting 66 conforms with the dimensions of pre-existing overflow fitting 100. In addition, the overflow 66 may include a label indicating "Waste" and "Save" indicating the direction of water flow through the valve.

Figure 5:
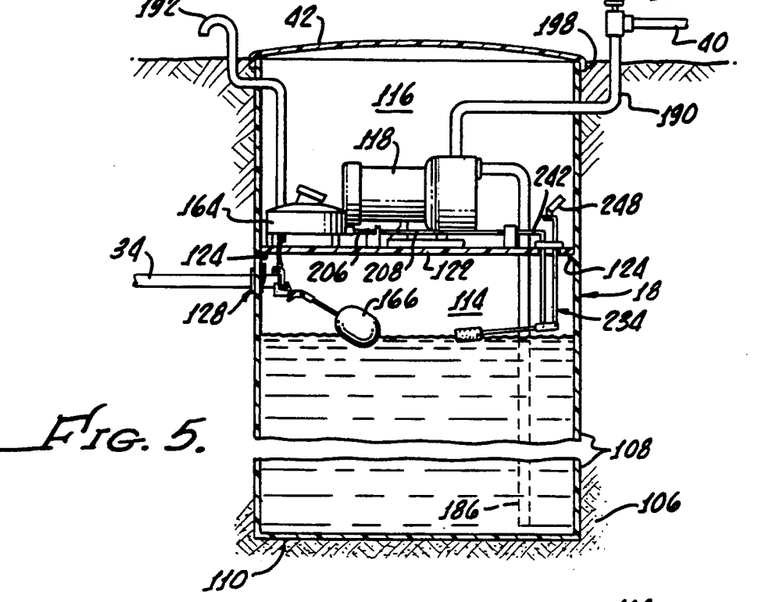
FIG. 5 is a cross-sectional view of a water storage tank in accordance with the present invention showing generally a water-fluid treatment tank, a tank valve having a float connected thereto for dispensing waste water treatment fluid into the storage tank during entry of water through the recycle line into the storage tank.

Referring now to FIG. 5 the water storage tank 18 in accordance with the present invention is shown in detail. As previously described, the water in storage tank 18 is located a few feet below the level of the bathtub/shower 16 so that gravity causes recycle water to actually flow into the storage tank 18. If the tank is disposed under the ground, the tank 18 is preferably surrounded by a one-inch thickness of pea gravel 106 on sides 108 of the tank 18 and 6 inches of pea gravel 106 on the bottom 110 of the tank 18. The pea gravel may prevent damage to the tank 18 in the event of movement of grounds surrounding the tank or uneven backfill by the installer.

The water storage tank 18 generally includes a first water storage compartment 114, a pump storage compartment 116 and a pump 118. The water storage compartment 114 is separated from the pump storage compartment 116 by a water storage compartment lid 122. The lid 122 is supported by a plurality of lid supports 124 formed into the tank sides 108. The lid 122 is removable for periodic cleaning and/or inspection purposes of the water storage compartment 114.

A tank inlet 128 formed in the tank side 108 receives the recycle line 34. The inlet 128 includes a fitting 130 fixed to the tank wall 108 and a removable fitting 134 coupled to the fitting 130 with a seal (not shown) therebetween. Quick release of the fitting 134 is provided by a yoke 138 which fits into a slot 140. Attached to the fitting 134 is an inlet pipe 144 having a flapper 146 pivotably attached thereto by means of arms 148.

Water flowing from the recycle line 34 forces the flapper 146 open by rotating flapper 146 about a shaft 152. The shaft 152 is connected to a metering valve which provides a means for dispensing a waste water treatment fluid into the water compartment 114 in response to water flowing into the tank 18 from the recycle water line 34. The metering valve 156, which is preferably a needle valve, dispenses an amount of waste water fluid 156 in response to the amount of water flow into the tank by way of the shaft 152 which is rotated to a greater degree by a large amount of water pushing the flapper 146 to a higher position. The metering valve 156 is connected by way of a tube 160 to a fluid tank 164 disposed on the lid 122 within the storage tank 18. The waste water treatment fluid may be any suitable disinfectant such as clorox.

A float 166 is connected to the pipe 144 by means of a float rod 170 and linkage 172 and provides means for shutting the flapper 146 when a water level reaches a selected level in order to prevent the tank overflow. The linkage 172 includes arms 178 fixed to the pipe 144 and a member 180 rotatably mounted between the arms 178 which includes upstanding fingers 182 which force the flapper 146 to a closed position when the float 166 is raised. Because the recycle line may be interconnected with a bathtub/shower 16 disposed on the second floor of a home, the float 166 should be appropriately sized so that it may exert sufficient pressure through the upstanding fingers 182 to maintain closure of the flapper 146 despite up to a 12 or 14 foot head of pressure due to water in the recycle line 34 from the bathtub/shower 16 to the tank 18.

Figures 6, 7:
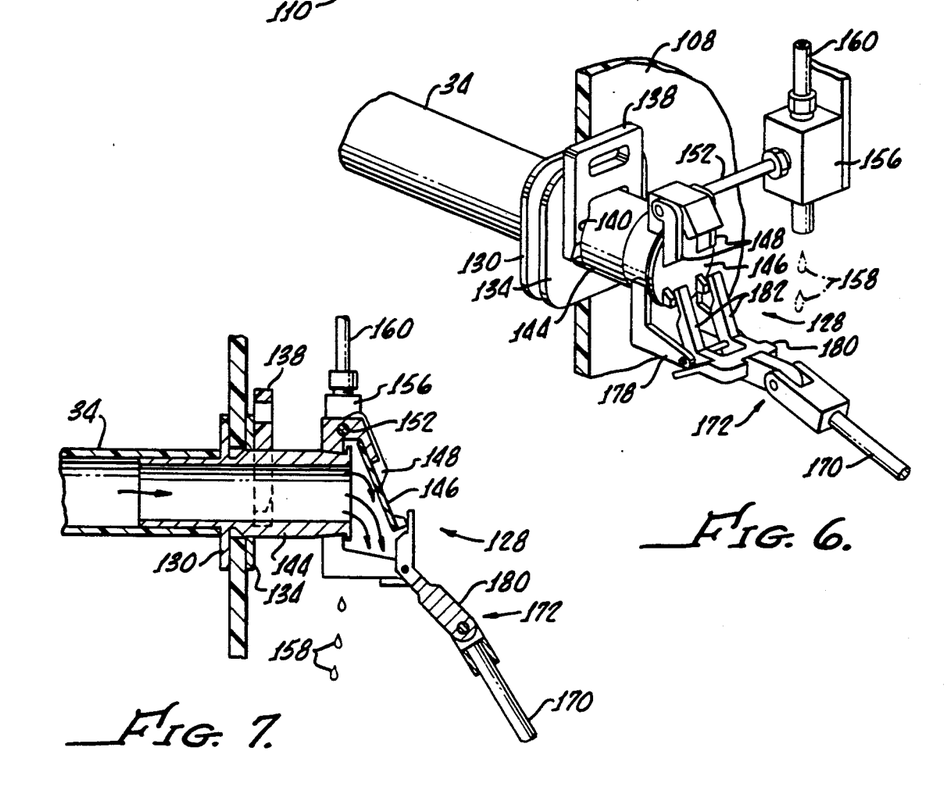
FIG. 6 is a perspective view of the tank vale.
FIG. 7 is a cross-sectional view of the tank valve shown in FIG. 6.

A cross-sectional view of the inlet 128 and flapper operation is shown in FIG. 7.

The pump 118 draws water from the water compartment 114 through a stand pipe 186 to delivery to the irrigation line 40. The pump 118 is preferably a Goulds Aqua-Lawn Trademark Sprinkling Pump, Series XSH and XSL, however, any suitable deposit of such pump may be employed. A pump primer inlet 188 may be provided in a pump discharge line 190 which is readily accessible above ground, enabling water to be introduced into the pump discharge line 190 in order to prime the pump 118 on start-up or after long periods of non-use.

Also, a moisture vent 192 may be provided to allow air and moisture to vent into and out of the compartment 116. The pump 118 further includes a safety bypass line which is preferably a ¼" PVC line returning from the discharge side of the pump 118 into the water storage compartment 116. The safety by-pass line prevents overheating of the pump if deadheading occurs.

The upper end of the pump storage compartment 116 is substantially flush with ground level and for protection, the lid 42 preferably includes an extended lip 198 extending 1 to 2 inches beyond the upper perimeter of the pump storage compartment 116. The lid 42 is preferably of a convex shape for strength and should be of sufficient strength to enable foot traffic thereover.

Figure 8:
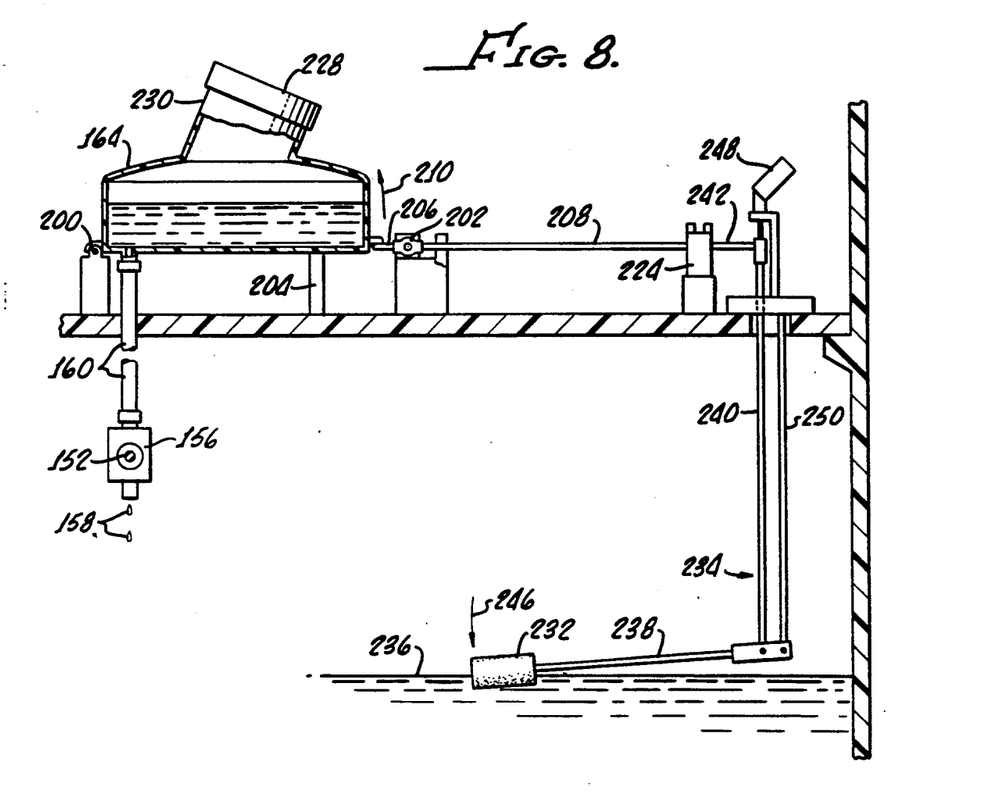
FIG. 8 is a view of the linkage system for disenabling the pump.
Figure 9:
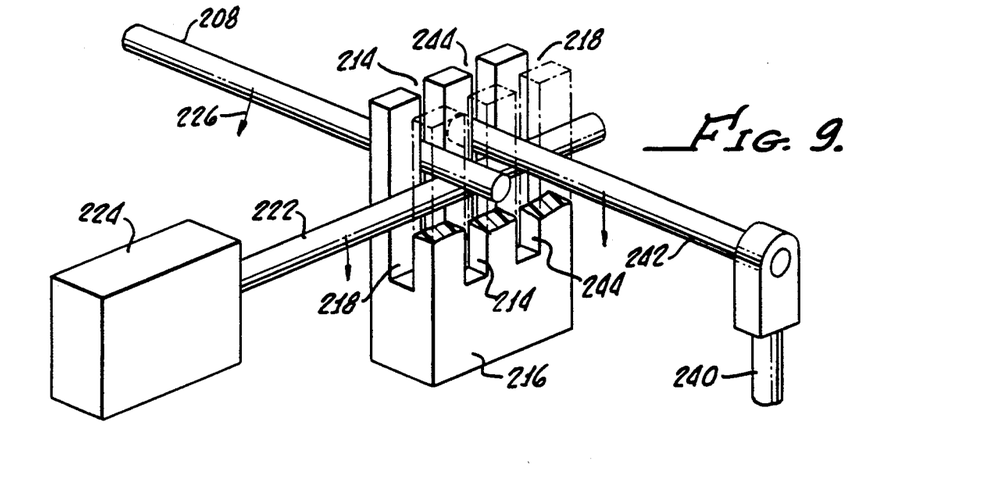
FIG. 9 is an enlarged perspective view of a coupling arrangement provided for enabling the treatment fluid tank and a water level float to operate a mercury switch.

Turning now to FIGS. 8 and 9 there is shown the moisture treatment fluid tank 164 pivotably attached to a mount and a rocker 202. When filled, the tank 164 is limited in a downward movement by a support post 204. By proper selection of the length of a tank arm 206 extending between the tank 164 and the rocker 202 and an extending arm 208 the tank 164 is enabled to move upward in a direction of arrow 210 by downward movement of the arm 208 in a slot 214 of a yoke 216.

Extending in a transverse slot 218 is an actuating arm 222 interconnected to a conventional mercury switch 224. As the tank 164 lightens due to removal of waste treatment fluid the arm 208 moves downward in the direction of arrow 226, depressing the actuating arm 222 and turning the mercury switch off. The mercury switch is attached in a conventional manner to the pump and acts to electrically disconnect the pump from a power source (not shown). Preferably the tank is sized and the arms 206, 208 selected so that the mercury switch turns the pump off with sufficient waste treatment fluid remaining in the tank 164 to treat at least one more tank full of recycle water. This arrangement prevents the use of any water as irrigation which has not been chemically treated.

The tank 164 may be formed from a suitable material and is preferably transparent or translucent in order to visually determine the amount of waste water fluid therein. Fluid may be added to the tank through a removable cap 228 which is accessible when the lid 42 is removed from the tank 18. An angled neck 230 enables the addition of fluid, such as clorox, while reducing the possibility of splashback.

A second float 232 and linkage 234 provide a second means for electrically disconnecting the pump when a low water level 236 is reached.

The linkage 234 includes a float arm 238 pivotably connected to an upstanding arm 240 and a transverse bar 242. The transverse bar 242 is disposed in a slot 244 in the yoke 216 for enabling the transverse bar 242 to depress the mercury switch arm 222 when the float 232 moves in a direction 246 to the low water level 236. Downward movement of the upstanding arm 234 causes the transverse arm 242 to depress the mercury switch arm 222 thereby turning off the switch and electrically disconnecting the pump.

Although there has been hereinabove described a dual outlet bathtub/shower drain valve and water conservation system in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A manually operated water drain control valve for use with an existing bathtub/shower having an existing water drain line, an existing overflow line, an existing sewer line and an existing water recycle line, said valve alternatively blocking water in the existing drain line or directing water from said existing drain line to either said existing sewer line or said existing water recycle line, the valve comprising;
    a first inlet adapted to be connected to said existing drain line for accepting water from said existing water drain line;
    a second inlet adapted to be connected to said existing overflow line for accepting water from said existing overflow line;
    a first outlet adapted to be connected to said existing sewer line;
    a second outlet adapted to be connected to said existing water recycle line;
    each of said first inlet, first outlet and second outlet having full port inlets and outlets, respectively, with internal diameters at least as large as the line to which the same can be connected;
    rotatable means for alternatively blocking the first inlet, the first outlet and the second outlet, such that water is blocked from the existing drain line or water from the first inlet and the second inlet flows out the second outlet when the first outlet is blocked, and the water from the first inlet and the second inlet flows out the first outlet when the second outlet is blocked, said rotatable means including a three-directional passage which is fully open to three of said inlets and outlets when either of said first outlet or second outlet is blocked, said rotatable means comprising an element having said three-dimensional passage therethrough, said element being disposed within an intersection of the first inlet, the second inlet, the first outlet and the second outlet;
    a handle connected to the element for rotating the element within the valve;
    a lever adapted to be located in the bathtub/shower accessible to a user thereof, the lever having a first position, a second position and a third position; and
    linkage connecting the lever and the handle, such that switching the lever between positions enabling water to selectively flow into the existing sewer line and the existing recycle water line and to block the existing drain line so the bathtub/shower may be filled.

2. The valve according to claim 1 wherein the element is ball-shaped.

3. The valve according to claim 1 wherein the element is cylindrical-shaped.

4. A valve according to claim 1 wherein the valve has a valve casing, the handle is accessible from the exterior of the valve casing and is interconnected with the ball-shaped element through the valve casing and further wherein the linkage is adapted to be positioned exterior to the existing drain line and the existing overflow line.

5. A valve according to claim 4 wherein the linkage is adapted to maintain a close radius to the existing drain line and the existing overflow line.

* * * * *